United States Patent [19]
Stolka

[11] 3,994,994
[45] Nov. 30, 1976

[54] PROCESS FOR PREPARATION OF BLOCK COPOLYMERS FROM VINYLCARBAZOLES AND OTHER ADDITION MONOMERS
[75] Inventor: Milan Stolka, Fairport, N.Y.
[73] Assignee: Xerox Corporation, Stamford, Conn.
[22] Filed: Feb. 19, 1975
[21] Appl. No.: 551,199

[52] U.S. Cl. .................................. 260/877; 96/1.5; 260/33.6 UA; 260/885; 260/886
[51] Int. Cl.$^2$ .................. C08L 53/00; C08L 31/02; C08L 25/14; G03G 5/07
[58] Field of Search.... 260/877, 885, 886, 33.6 UA; 96/1.5

[56] References Cited
UNITED STATES PATENTS

| | | | |
|---|---|---|---|
| 3,594,358 | 7/1971 | Moberly | 260/885 |
| 3,652,724 | 3/1972 | Shimomura et al. | 260/877 |
| 3,676,190 | 7/1972 | Landler et al. | 260/885 |
| 3,860,674 | 1/1975 | Sheppard et al. | 260/886 |

Primary Examiner—Murray Tillman
Assistant Examiner—Thurman K. Page
Attorney, Agent, or Firm—James J. Ralabate; James P. O'Sullivan; John H. Faro

[57] ABSTRACT

Process for preparation of block copolymers having photoconductive segments derived from a vinyl monomer and segments derived from a second addition monomer; said addition polymer segment also possibly being photoconductive. A polymer is initially prepared from one of the above monomers whereby the terminal groups of the resultant polymer are capable of generation of free radicals. By the appropriate selection of reaction medium it is possible to use the above free radical generating polymer to initiate polymerization of the second monomer, the polymer of which thereafter precipitates. This polymerization continues in the solid phase thereby preventing free radical decay even after depletion of the second monomer. The free radicals of these "living" polymers are quenched by the addition to the reaction medium of a monomer preferably corresponding to the structural units of the free radical generating polymer. This "heterophase" polymerization system eliminates the need for separate extraction of homopolymer fractions and other impurities from the resultant block copolymer.

33 Claims, No Drawings

PROCESS FOR PREPARATION OF BLOCK COPOLYMERS FROM VINYLCARBAZOLES AND OTHER ADDITION MONOMERS

BACKGROUND OF THE INVENTION

1. Field of the Invention

This invention relates to an improved process for preparation of block copolymers from addition monomers incapable of anion initiated addition polymerization. More specifically, this invention involves a process for the heterophase sequential polymerization of addition monomers in preparation of block copolymers. This process lends itself to the preparation of block copolymers having predetermined electronic and physical properties.

2. Description of the Prior Art

The formation and development of images on the imaging surfaces of photoconductive materials by electrostatic means is well known. The best known of the commercial processes, more commonly known as xerography, involves forming a latent electrostatic image on the imaging surface of an imaging member by first uniformly electrostatically charging the surface of the imaging layer of said member in the dark and then exposing this electrostatically charged surface to a light and shadow image. The light-struck areas of the imaging layer are thus rendered relatively conductive and the electrostatic charge selectively dissipated in these irradiated areas. After the photoconductor is exposed, the latent electrostatic image on the image-bearing surface is rendered visible by development with a finely divided, colored marking material, known in the art as "toner". This toner will be principally attracted to those areas on the image bearing surface which have a polarity of charge opposite to the charge on the toner particles and thus form a visible powder image.

The developed image can then be read or permanently affixed to the photoconductor where the imaging layer is not to be reused. This latter practice is usually followed with respect to the binder type photoconductive films (e.g. zinc oxide/insulating resin binder) where the photoconductive imaging layer is also an integral part of the finished copy, U.S. Pat. Nos. 3,121,006 and 3,121,007.

In so called "plain paper" copying systems, the latent image can be developed on the imaging surface of a reusable photoconductor or transferred to another surface, such as a sheet of paper, and thereafter developed. When the latent image is developed on the imaging surface of a reuseable photoconductor, it is subsequently transferred to another substrate and then permanently affixed thereto. Any one of a variety of well known techniques can be used to permanently affix the toner image to the copy sheet, including overcoating with transparent films and solvent or thermal fusion of the toner particles to a supportive substrate.

In the above plain paper copying systems, the materials used in the photoconductive insulating layer should be preferably capable of rapid switching from insulating to conductive to insulating state in order to permit cyclic use of the imaging surface. The failure of the material to return to its relatively insulating state prior to the succeeding charging/imaging sequence will result in an increase in the residual potential of the photoconductor. This phenomenon, commonly referred to in the art as "fatigue" has in the past been avoided by the selection of photoconductive materials possessing rapid switching capacity. Typical of the materials suitable for use in such a rapidly cycling imaging system include anthracene, sulfur, selenium and mixtures thereof (U.S. Pat. No. 2,297,691); selenium being preferred because of superior photosensitivity.

In addition to anthracene, other organic photoconductive materials, most notably, poly(N-vinylcarbazole) have been in the focus of increasing interest in electrophotography, U.S. Pat. No. 3,037,861. Until recently, neither of these organic materials have received serious consideration as an alternative to such inorganic photoconductors as selenium, due to fabrication difficulties and/or to a relative lack of speed and photosensitivity. The recent discovery that high loadings of 2,4,7-trinitro-9-fluorenone in poly(vinylcarbazoles) dramatically improves the photoresponsiveness of these polymers has led to a resurgence in interest in organic photoconductive materials, U.S. Pat. No. 3,484,237. Unfortunately, films prepared from poly(-vinylcarbazoles) have poor mechanical properties (e.g. brittleness and relatively inflexibility). The addition of high loadings of activators, such as those described in the '237 patent, further impair the mechanical properties of such films.

The orientation of vinylcarbazole polymers is generally known to improve the mechanical properties of these materials, U.S. Pat. No. 2,215,573. However, where a film of poly(N-vinylcarbazole) is mechanically uniaxially oriented, the charge transport properties of the resultant film are somewhat impaired. During such uniaxial orientation, pendant carbazyl functional groups are believed to be spatially constrained within the composition. Such modification in the steric relationship of adjacent pendant carbazyl groups is also believed to be responsible for the deterioration in charge transport properties of the polymer.

One method commonly employed for enhancement of mechanical properties of a polymeric material is to form a block copolymer of said polymeric material with an elastomer. One of the more efficient of the reported methods for preparation of such block copolymers involves the addition of a monomer to a "living" polymer (prepared by unterminated anionic polymerization techniques); see F. W. Billmeyer, *Textbook of Polymer Science*, 2nd Edition, Chapter 10 and 11, Wiley-Interscience Publishers, (1971) and associated bibliography. The addition of an addition monomer to a living polymer leads to the formation of di-block copolymers substantially free from contamination by homopolymer fractions. The use of a di-functional living polymer will lead to the formation of triblock copolymers. Unfortunately, N-vinylcarbazole and its analogues cannot be polymerized anionically. Thus, they cannot be formed into living polymers nor can they be copolymerized with living polymers since the polymerization mechanism is substantially the same in both instances.

Accordingly, it is the object of this invention to remedy the above as well as related deficiencies in the prior art.

More specifically, it is the object of this invention to provide a process for synthesis of photoconductive polymers having enhanced mechanical properties.

It is the principal object of this invention to provide a process for preparation of block copolymers from monomers generally regarded as incapable of anion initiated polymerization.

It is another object of this invention to provide a process for preparation of block copolymers containing photoconductive segments wherein said copolymers are substantially free of impurities thus eliminating or minimizing the separate extraction of such impurities from the copolymer.

It is yet another object of this invention to provide a process for enhancing the flexibility of photoconductive polymers by forming block copolymers of such materials with elastomeric materials.

It is still yet another object of this invention to provide a process for reducing the brittleness of photoconductive polymers by forming block copolymers of such materials with elastomeric materials.

SUMMARY OF THE INVENTION

The above and related objects are achieved by providing an improved process for preparation of block copolymers having photoconductive segments derived from a vinyl monomer and segments derived from a second addition monomer which may or may not be photoconductive. At least one, and possibly both, of the monomers suitable for use in this process can be incapable of anion initiated addition polymerization. According to this improved process a polymer is prepared from one of the above monomers whereby the terminal groups of the resultant polymer are capable of the decomposition to free radicals. This polymer is thereafter intimately contacted with the second monomer in a liquid reaction medium, said medium being a solvent for the free radical generating polymer and the second monomer; yet a non-solvent for the homopolymer of said second monomer and consequently, the copolymer of said radical generating polymer and said second monomer is also insoluble. Upon formation of the block copolymer and the homopolymer of the second monomer, these polymers precipitate from the reaction medium. The polymerization of the respective polymers continues in the solid phase until the reaction medium is depleted of the second monomer. The solid phase nature of this system inhibits the mobility of the propagating free radical, thus preventing free radical decay. These living polymers are then allowed to terminate by the addition to the reaction medium of a monomer charge, corresponding to the structural units of the soluble free radical generating polymer. This process eliminates the need for separate extraction of such entrapped materials, thereby insuring the preparation of a substantially single phase copolymer composition. In a preferred process of this invention, the copolymer is prepared from an N-vinylcarbazole monomer, a poly(lauryl)methacrylate radical generating polymer and a lauryl methacrylate monomer.

DESCRIPTION OF THE INVENTION INCLUDING PREFERRED EMBODIMENTS

According to one of the embodiments of the process of this invention, terminal peroxide groups are initially introduced onto a polymer. This polymer can be either photoconductive or substantially nonphotoconductive and such terminal groups can be either introduced via chemical modification of a reactive end group (e.g. carboxylic acid) or through the use of a sequential free radical initiator compound in the polymerization of the monomer from which this polymer is formed. This peroxidic terminated polymer can then be used to initiate polymerization of a second monomer, which will be propagated as a block segment attached to the peroxidic terminated polymer. The polymeric product obtained from the above procedure contains both multiblock copolymer and, to a lesser extent homopolymer fractions of each of the constituents of the block copolymer. The precise nature of these polymeric products and the average relative length of the individual segments of the block copolymer will be determined by a number of factors; namely, the rate of addition of the monomer to the peroxidic moieties, the relative concentration of peroxidic groups, relative concentration of monomers, the temperature, and (to some extent) the reaction medium.

The multiblock copolymers prepared according to the above procedures comprise segments from at least two chemically distinct monomers; at least one of which is capable of formation of a photoconductive polymer. The photoconductive segment of the block copolymer can be prepared from an addition monomer, which is either capable or incapable of polymerization by anion initiated polymerization techniques. This process is especially suitable for preparation of block copolymers where at least one of the constituent monomers is incapable of polymerization by anion initiated polymerization yet capable of radical initiated polymerization. Representative of the vinyl monomers which can be used in preparation of the multiblock copolymers of this invention include any one of the vinylcarbazoles, vinylpyrene, vinylnaphthalene, 2-vinylanthracene, 3-vinylperylene, and 9-vinyljulodine. Ordinarily, the photoconductive polymers prepared from the above vinyl monomers have relatively poor mechanical properties. In order to minimize such deficiencies and make these materials more suitable for use in flexible electrophotographic imaging members, these photoconductive polymers can be block copolymerized with polymeric segments having increased resiliency and impact resistance. Representative of such polymeric materials are the acrylates (e.g. poly(methyl methacrylate), poly(ethyl methacrylate), and poly (lauryl methacrylate)), the dienes (e.g. poly (butadiene), poly (isoprene)) and certain vinyl polymers (e.g. poly(styrene)).

Either nonomer from which the individual segments of block copolymer are formed can now be polymerized in such a manner so as to introduce terminal peroxide groups onto the individual segments of the respective polymers. As indicated previously, this can be achieved by terminating the polymerization of the polymer with a chemically reactive group, which can be subsequently converted to a peroxide or by the free radical initiated polymerization of the monomer with a sequential free radical initiator compound. Such free radical initiator compounds are characterized as having at least two distinct species of free radical generating groups, one of which being more stable than the other(s). Free radicals can be generated by selective decomposition of the more unstable of these groups by exposure of the initiator compound to heat, electromagnetic radiation and/or chemical stimuli. Such radical generating groups can be either a peroxide or an azo group. Sequential free radical initiator compounds suitable for use in this process can be represented by the following formulae

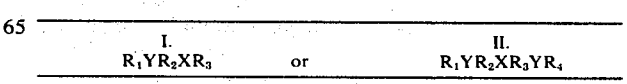

| I. | | II. |
|---|---|---|
| $R_1YR_2XR_3$ | or | $R_1YR_2XR_3YR_4$ | wherein R is a hydrocarbon group and X and Y are free radical generating moieties. The decomposition temperatures of X and Y can be described in terms of the ten-hour half life of each; namely the temperature at which 50 percent of the radical generating groups will decompose within a ten-hour period. The table, which follows is illustrative of three such sequential free radical initiators.

monomers should also be considered in determining their relative order of polymerization. It is generally preferred to polymerize the more impure monomer first since some of these impurities can often initiate free radical polymerization at elevated temperatures.

Termination of a radical polymerization reaction can occur either by coupling or by disproportionation. In the event of termination by coupling, the resulting

TABLE I
SEQUENTIAL FREE-RADICAL INITIATORS

| Formula | Type | °C $T_{(10)1/2(X)}$ | °C $T_{(10)1/2(Y)}$ |
|---|---|---|---|
| $CH_3-\underset{CH_3}{\underset{|}{\overset{CH_3}{\overset{|}{C}}}}-N=N-\underset{CH_3}{\underset{|}{\overset{CN}{\overset{|}{C}}}}-(CH_2)_2-\overset{O}{\overset{\|}{C}}-O-O-\underset{CH_3}{\underset{|}{\overset{CH_3}{\overset{|}{C}}}}-CH_3$  X  Y<br>t.Butylperoxy-4-t.butylazo-4-cyanovalerate | I | 76 | 102 |
| $CH_3-\underset{CH_3}{\underset{|}{\overset{CH_3}{\overset{|}{C}}}}-O-O-\overset{O}{\overset{\|}{C}}(CH_2)_2-\underset{CH_3}{\underset{|}{\overset{CN}{\overset{|}{C}}}}-N=N-\underset{CH_3}{\underset{|}{\overset{CN}{\overset{|}{C}}}}-(CH_2)_2-\overset{O}{\overset{\|}{C}}-O-O-\underset{CH_3}{\underset{|}{\overset{CH_3}{\overset{|}{C}}}}-CH_3$  Y  X  Y<br>Di-t.butyl-4,4'-azobis-(4-cyanoperoxyvalerate) | II | 61 | 104 |
| $CH_3-\underset{CH_3}{\underset{|}{\overset{CH_3}{\overset{|}{C}}}}-O-O-\underset{CH_3}{\underset{|}{\overset{CH_3}{\overset{|}{C}}}}-CH_2-\underset{}{\overset{CH_3}{\overset{|}{CH}}}-O-\overset{O}{\overset{\|}{C}}-O-O-\overset{O}{\overset{\|}{C}}-O-\underset{}{\overset{CH_3}{\overset{|}{CH}}}-CH_2-\underset{CH_3}{\underset{|}{\overset{CH_3}{\overset{|}{C}}}}-O-O-\underset{CH_3}{\underset{|}{\overset{CH_3}{\overset{|}{C}}}}-CH_3$  Y  X  Y<br>Di-[1,3-dimethyl-3-(t.butylperoxy)butyl]peroxy dicarbonate | II | 47 | 127 |

The above compounds are commercially available from the LUCIDOL Chemicals Division of Pennwalt Corporation, (catalogue number, Compound 1, R-S630; Compound 2, R-S604; Compound 3, R-S904). In a preferred embodiment of this invention, the difference between the ten-hour half life temperature of the two distinct radical generating groups of a sequential free radical initiator compound should be at least 30° C or greater.

According to the processes of this invention, a sequential free radical initiator of the type described above is used to initiate polymerization of a monomer capable of formation of a photoconductive polymer or a monomer capable of formation of a second polymer (which may also be photoconductive). It does not appear to make any difference whether or not peroxidic terminal groups are located upon either type of polymer segment. The various monomers suitable for use in this invention can, however, differ substantially in their relative thermal stability and thus, it is generally preferable to polymerize the less thermally stable monomer first and thereafter employ the resulting peroxidic terminated polymer in the polymerization of the more thermally stable monomer. Of course, the thermal stability of the later polymerized monomers must be sufficient so as not to spontaneously polymerize in advance of the thermal decomposition of the free radical generating groups of the peroxidic terminated polymer. In addition to thermal stability, the relative purity of the polymeric segment will have terminal peroxidic groups at both ends. Where termination occurs by disproportionation, peroxidic functionality will only occur at one end of the polymeric segment. Unlike typical anionic polymerization techniques of the type described previously with regard to the formation of living polymeric segments, the initiator compound need not fully decompose to free radicals nor the first monomer fully polymerize, since the polymeric materials prepared by the initial breakdown of one such free radical generating group can be isolated and thus freed from unreacted initiator and monomer prior to the polymerization of a second chemically distinct monomer.

The relative population of each species of block copolymer depends upon the specific type of radical decay. If, for example, polymer (A) is prepared from monomer A by free radical initiated addition polymerization with a sequential initiator, and terminated by coupling, the undecomposed radical generating groups at the terminal portions of said polymer can subsequently undergo thermal decomposition to produce free radicals as follows:

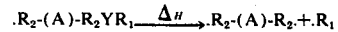

Where the polymerization of the monomer A is terminated by disproportionation, the undecomposed radical generating groups can subsequently undergo thermal decomposition to produce free radicals as follows:

$$R_1YR_2\text{-}(A) \rightarrow R_1\cdot + \cdot R_2\text{-}(A)$$

As is readily apparent from the above series of equations, the introduction of the second monomer (B) into a reaction vessel containing a peroxidic terminated polymer will result in a polymeric mixture containing both block and homopolymer fractions.

$$R_1\cdot + B \rightarrow R_1\text{-}(B).$$
$$\cdot R_2\text{-}(A)\text{-}R_2\cdot + B \rightarrow \cdot(B)\text{-}R_2\text{-}(A)\text{-}R_2\text{-}(B).$$

or $$R_1\cdot + B \rightarrow R_1\text{-}(B).$$
$$\cdot R_2\text{-}(A) + B \rightarrow \cdot(A)\text{-}R_2\text{-}(B).$$

Where it is possible to selectively control the type of free radical decay of a peroxidic terminated polymer, the number of polymeric products obtainable can be controlled by controlling the termination mechanism in the formation of the peroxidic terminated polymer and in controlling the termination mechanism with regard to the polymerization of the second monomer. The table which follows lists the types of block copolymers obtainable depending upon the specific combination of termination mechanism.

| MECHANISM OF TERMINATION | | |
|---|---|---|
| Peroxidic Terminated Polymer | Block Copolymer | Type of Copolymer |
| Disproportionation | Disproportionation | AB |
| Disproportionation | Coupling | AB + ABA |
| Coupling | Disproportionation | BAB |
| Coupling | Coupling | B(AB)$_n$B |

One method for controlling the termination mechanism is to select monomers which terminate by only one mechanism. For example, N-vinylcarbazole can be polymerized by free radical initiated addition polymerization techniques and termination of such polymerization is generally believed to occur by a coupling rather than by a disproportionation mechanism.

As should now be apparent from the preceding discussion, it is highly probable that homopolymers of both A and B will be formed by the above process concurrent with preparation of di-, tri- and multiblock copolymers. Failure to separate these competing polymerizations will result in an heterogenous polymer blend wherein homopolymer fractions are physically entrapped within the copolymer products. In this type of heterogenous polymeric blend it is impossible to control the size of the individual domains of polymeric materials, therefore, the extent of phase separation cannot be readily manipulated thus increasing the probability of trapping sites at the interfaces of these domains which can impair the electronic properties (rate and completeness of photodischarge and efficiency of transport of charge carrier injected into it from a photogenerator material) of the composition.

Traditionally, the removal of such impurities has been performed by solvent extractions. However, such extractions are often lengthy and costly and can introduce additional impurities into the materials which are the object of such purification. According to the process of this invention, the copolymerization of the radical generating polymer and the second monomer proceeds by initially "dissolving" these reactants in a substantially phase compatible liquid reaction medium. This liquid reaction medium must be substantially phase incompatible with the homopolymer of the second monomer and also substantially phase incompatible with both the block copolymer and homopolymer formed during the initial polymerization sequence of this process. The terms "phase compatibility," "phase incompatibility," "solvent" and "non-solvent" are used herein to describe the relative ability of the liquid reaction medium to dissolve or form a miscible fluid system with the reactants and reaction products of the process of this invention. The temperature at which such materials are "dissolved" in such a liquid will be determined by a number of factors, including relative thermal stability of monomers, relative thermal stability of the radical generating moiety, relative thermal stability of the polymeric products and the boiling point of the liquid reaction medium. Solubility or phase compatibility of the liquid reaction medium with the reactants and products of this process is viewed at the temperature of operation of the process. In a preferred embodiment of this invention, the radical generating polymer initiates polymerization of the second monomer by thermal decomposition of the radical generating moiety. Therefore, the relative solubility/phase compatibility of the materials in the polymerization is judged at the temperature of decomposition of the radical generating groups, of the polymer to free radicals.

After the terminal groups of radical generating polymer have been decomposed to free radicals, the single phase character of the liquid reaction medium begins to change. As the second monomer is polymerized (either as a homopolymer or as a propagating segment from the radical generating polymer), it gradually forms solid phase particles within the liquid reaction medium. Since these particles are interconnected by the dissolved segments of the more soluble radical generating polymer, the reaction mixture takes on the appearance of a gel. It is both critical and essential to the success of this process that this solid polymeric precipitate in the gel be permeable to the liquid reaction medium in order to permit the diffusion into the solid particles of additional quantities of monomer in order for propagation of the free radical to continue. The polymer/copolymer will continue to grow until the liquid reaction medium is depleted of the second monomer. Because of the nature of this gelatinous polymer, the free radicals become trapped or immobilized within the polymeric solids, thus preventing termination of the growing polymer either by coupling or disproportionation. These living polymers are then brought in contact with yet another addition monomer capable of radical polymerization. This monomer must be soluble/phase compatible with the liquid reaction medium and, upon initiation of polymerization thereof by the living polymers, form polymer segments which are also soluble/phase compatible with the liquid reaction medium. Since the propagating segment of the polymer solids is no longer entrapped therein, termination can now occur by either one or both of the conventional mechanisms.

Once having prepared these block copolymers, they can be cast from suitable solvents into flexible, self-supporting films. The individual segments making up these copolymers are substantially phase incompatible with one another and thus, upon solvent casting of films of such polymers, the resulting product will comprise a multiphase material having discrete micro-domains of one type of polymeric material dispersed within a matrix of the second polymeric material. The relative location of one phase is determined by the relative concentration of each polymeric segment in the block copolymer and, to a lesser extent, the solvent used in forming of the polymer film. For example, where the photoconductive polymeric segments are substantially more soluble than the non-photoconductive polymeric segments in the casting solvent, the resulting dispersion will generally comprise discrete micro-domains of non-photoconductive polymer dispersed within a matrix of photoconductive polymer. Similarly, where the non-photoconductive segments of the block copolymer are preferentially more soluble in the casting solvent phase inversion will occur in the resultant product. The films prepared from the above block copolymers will generally appear clear to the naked eye since domain size of the phase incompatible segment is often smaller than the shortest wavelengths of visible light.

The photoconductive polymeric films prepared by the above procedure can be cast directly on an appropriate (preferably conductive) substrate and the article prepared thereby used in an electrophotographic imaging system. Representative of the substrates which are suitable for use in combination with such polymeric films include aluminum, chromium, brass, nickel, metal coated plastic films (aluminized Mylar) and tin oxide coated glass plates (Nesa glass). After having prepared a photoconductive polymeric film on a suitable conductive substrate, the resulting composite can be sensitized by charging in the dark, followed by selective exposure to image information, whereby the uniform charge on the surface of the photoconductive film will be selectively dissipated, thus forming a latent electrostatic image. This latent image can be rendered visible by any of the conventional electrophotographic developer materials.

Where it is desirable to enhance or extend the spectral response of these block copolymers, activator molecules and/or dyestuff sensitizers can be incorporated within these polymeric materials by conventional means.

The Examples which follow further define, describe and illustrate the preparation of the block copolymers of this invention. The apparatus and techniques used in the synthesis and evaluation of these materials are standard or as hereinbefore described. Parts and percentages appearing in such Examples are by weight unless otherwise indicated.

EXAMPLE I

Preparation of block copolymers of lauryl methacrylate and N-vinylcarbazole

Preliminary to the preparation of this block copolymer, lauryl methacrylate monomer (LMA) is purged of inhibitor by extraction with a saturated solution of sodium carbonate containing about 1–2 weight percent (based on sodium carbonate concentration) of potassium hydroxide. This extraction is repeated six times until all color has disappeared from the monomer. The colorless monomer is then extracted with water (to neutral reaction), dried over anhydrous magnesium sulfate and filtered. N-vinylcarbazole (NVCZ) — K & K Labs, Plainview, N.Y. — is crystallized from methanol for the removal of impurities.

About 58 grams of purified lauryl methacrylate monomer is dissolved in 150 milliliters benzene, the reaction vessel containing this solution purged of air with nitrogen and 2 milliliters di-[1,3-dimethyl-3-(t-butylperoxy)butyl]peroxy dicarbonate (LUCIDOL R-S904, Lucidol Chemicals Division of Pennwalt Corporation, Buffalo, New York). The resulting solution is heated to about 50° C with agitation and allowed to polymerize for approximately 7 hours; yield 48 grams (83%) $\overline{M}_n$ 90,000, $\overline{M}_w$ 338,000, $\overline{M}_w/\overline{M}_n \sim 3.7$.

About 5 grams of poly(lauryl methacrylate) radical generating polymer, prepared as described above, and 7 grams N-vinylcarbazole are added to a resin kettle containing 70 milliliters n-decane. The resin kettle is purged of air within nitrogen and its contents heated under reflux to about 135° C with continuous agitation. The polymerization of the N-vinylcarbazole is allowed to proceed to completion (approximately 7 hours) whereupon 1.75 grams of lauryl methacrylate monomer are introduced into the resin kettle through an addition funnel. The reaction conditions within the resin kettle during polymerization of the lauryl methacrylate monomer are the same as those prevailing during polymerization of the N-vinylcarbazole monomer. The addition of lauryl methacrylate monomer enables termination of the living carbazole homopolymer and addition of another polymer segment to the block copolymer.

The polymerization of the lauryl methacrylate is quenched after 7 hours with methanol, the polymer solids recovered by filtration and dried in a vacuum over at 60° C. In a parallel synthesis the polymerization of the lauryl methacrylate monomer was carried out at 65° C. The only other difference between these parallel systems involves dissolving the polymers solids in benzene in the lower temperature synthesis followed by quenching in methanol. Since the N-vinylcarbazole polymer solids are soluble in the benzene, any remaining entrapped free radicals become increasingly mobile thus permitting their termination by coupling. Comparison of the products prepared in these two syntheses indicates that the molecular weight of the multiblock copolymer can be substantially increased when the trapped radicals are given a chance to terminate by coupling; coupling being favored as the primary mechanism for methacrylate radical decay.

The table which follows provides data on the physical properties of the copolymers prepared in these parallel systems. Molecular weight determinations are based on gel permeation chromatography (GPC) measurements and light scattering measurements.

| | HETEROPHASE BLOCK COPOLYMERIZATION OF LMA AND NVCZ | | | | | | |
|---|---|---|---|---|---|---|---|
| | polymerization temp., 135° C | | | polymerization temp., 65° C | | | |
| | Composition NVCZ:LMA MOLE % | $\overline{M}_n$ | $\overline{M}_w$ | Composition NVCZ:LMA MOLE % | $\overline{M}_n$ | $\overline{M}_w$ | Remarks |
| Unfractionated product | 64.7: 35.3 | ~ 100,000 | 900,000 | 64.5: 35.5 (100%) | > 100,000 | 1,900,000 | 1 |
| Hexane Soluble | 9.7: 90.3 | 90,000 | 176,000 | 17.4: 82.6 (8 wt.%) | 83,000 | 183,000 | 2 |
| Hexane insoluble DMF soluble | 80.2: 19.8 | 43,000 | 138,000 | 94.9: 5.4 (16 wt.%) | 85,000 | 181,000 | 3 |
| Hexane insoluble DMF insoluble | 57.0: 43.0 | 220,000 | 1,260,000 | 63.8: 36.2 (76 wt%) | 380,000 | 2,850,000 | 4 |

1. The value obtained from GPC is only approximate, since we are dealing with a complex system containing the whole spectrum of compositions ranging from long blocks of LMA with very short blocks of NVCZ to NVCZ rich blocks with short tails of LMA.
2. The hexane-soluble fraction is rich on PLMA (~ 90 mole%) it is mostly block copolymer of PLMA with short chains of PVCZ. Therefore the Q value used is that for P(LMA) (Q = 87).
3. DMF soluble fraction is either PVCZ or block copolymer of PVCZ with short chains of P(LMA). Total amount of LMA is about 5–20%. The Q value used is that for PVCZ (Q = 55).
4. Determination by light scattering.

Based upon the above and other empirical tests, it is estimated that for best results, the solubility parameters ($\delta$) of the radical generating polymer and the liquid reaction medium differ ($\Delta\delta$) by less than about 1.5 Hildebrand units; that the solubility parameters of the solvent and the homopolymer formed from the second monomer differ ($\Delta\delta$) by at least 1.8 Hildebrand units; and that the solubility parameters of the precipitated segments of block copolymer and the monomer corresponding to the structural units of the radical generating polymer differ ($\Delta\delta$) by less than 3.1 Hildebrand units. Many of the solubility parameters for common solvents and the more popular polymers and monomers are readily available in tabular form in reference texts, see Burrell, H., Polymer Handbook — Chapt. 4, (J. Brandrup and E. H. Immergut, Eds) Intersciences Pub, N.Y. 1955) and can be calculated from heat of vaporization or from molecular structure.

The multi-block copolymers prepared as described above are separated from the reaction medium by precipation with methanol, the precipitated solids recovered by filtration and dried in a vacuum oven at 60° C.

The block copolymers prepared according to the above procedures are evaluated electrophotographically in the so-called "active matrix" mode in order to determine the extent to which the transport properties of the poly(N-vinyl-carbazole) are effected by the presence of poly(lauryl-methacrylate). The evaluation consists initially of coating a ball grained aluminum plate with a vacuum deposited film of amorphous selenium approximately 0.5 $\mu$ in thickness. The free surface of the selenium layer is thereafter overcoated with film of block copolymer by standard draw down coating technique. The dry film thickness of the block copolymer film is ≈15$\mu$. A control sample is also prepared in the same manner described above except that a film of poly(N-vinylcarbazole) is substituted for the film of block copolymer. The photosensitive recording members prepared in the above manner are then initially sensitized by charging in the dark to a positive potential of 1000 volts and thereafter subjected to a light flash of 200 milliseconds duration from a Vivitar Electronic Flash Unit, Model 252. The conditions selected for this evaluation cause photodischarge of the control sample from 1000 to 300 volts in less than 1/20 of a second and thus provide a basis for comparison of the transport properties of the block copolymers prepared according to this invention.

What is claimed is:
1. A process for preparation of block copolymers having photoconductive segments derived from a vinyl monomer and segments derived from a second addition monomer, at least one of said vinyl monomer and said addition monomer being incapable of polymerization by anion initiated polymerization techniques and both said monomers being capable of polymerization by free radical initiated addition polymerization techniques, said process comprising:
 a. providing a photoconductive vinyl polymer having terminal groups capable of decomposition to free radicals;
 b. combining said photoconductive vinyl polymer and a second addition monomer by dissolving both in a liquid reaction medium, said liquid reaction medium being a solvent for the photoconductive vinyl polymer and the second addition monomer and a non-solvent for the block copolymer segments and homopolymers derived from the second addition monomer; and
 c. decomposing the terminal groups of said photoconductive polymer to free radicals in the presence of said second addition monomer, whereby at least some of said second addition monomer is polymerized and forms a polymer segment attached to the photoconductive polymer thereby causing this block polymer to become increasingly less soluble in the liquid reaction medium; and
 d. adding sufficient vinyl monomer corresponding to the structural units of the photoconductive polymer to the liquid reaction medium to effect termination of the propagating radical of the insoluble polymers contained therein, said vinyl monomer being soluble in the liquid reaction medium.

2. The process of claim 1 wherein said polymer segments derived from the second addition are photoconductive.

3. The process of claim 1 wherein said photoconductive vinyl polymer is derived from vinylcarbazole monomers.

4. The process of claim 1 wherein said photoconductive vinyl polymer is derived from N-vinylcarbazole monomer.

5. The process of claim 1 wherein said photoconductive vinyl polymer is derived from a monomer incapable of anion initiated addition polymerization.

6. A process for preparation of block copolymers having photoconductive segments derived from a vinyl monomer and segments derived from a second addition monomer, at least one of said vinyl monomer and said addition monomer being incapable of polymerization by anion initiated polymerization techniques and both said monomers being capable of polymerization by free radical initiated addition polymerization techniques, said process comprising:
  a. providing a non-photoconductive addition polymer having terminal groups capable of decomposition to free radicals;
  b. combining said non-photoconductive addition polymer and said vinyl monomer by dissolving both in a liquid reaction medium, said liquid reaction medium being a solvent for the non-photoconductive addition polymer and the vinyl monomer and a non-solvent for the block copolymer segments and homopolymers derived from the vinyl monomer;
  c. decomposing the terminal groups of said non-photoconductive polymer to free radicals in the presence of said vinyl monomer, whereby at least some of said vinyl monomer is polymerized and forms photoconductive polymer segments attached to the non-photoconductive polymer, thereby causing the non-photoconductive polymer to become increasingly less soluble in the liquid reaction medium; and
  d. adding sufficient non-photoconductive addition monomer to the liquid reaction medium to effect termination of the propagating radical of the insoluble polymers contained therein, said non-photoconductive addition monomer being soluble in the liquid reaction medium.

7. The process of claim 6 wherein said non-photoconductive addition polymer is derived from an acrylate monomer.

8. The process of claim 6 wherein said non-photoconductive addition polymer is derived from lauryl methacrylate.

9. The process of claim 6 wherein said vinyl monomer is incapable of polymerization by anion initiated addition polymerization techniques.

10. The process of claim 6 wherein said vinyl monomer is a vinylcarbazole.

11. The process of claim 6 wherein said vinyl monomer is N-vinylcarbazole.

12. A process for preparation of block copolymers having photoconductive segments derived from a vinyl monomer and segments derived from a second addition monomer, at least one of said vinyl monomer and said addition monomer being incapable of polymerization by anion initiated polymerization techniques and both said monomers being capable of polymerization by free radical initiated addition polymerization techniques, said process comprising:
  a. providing a sequential free radical initiator compound having at least two free radical generating centers of differing stability, one of said free radical generating centers being more unstable than the other(s) in that it is more prone to decomposition upon exposure to thermal, electromagnetic or chemical stimuli;
  b. intimately contacting said sequential free radical initiator with the vinyl monomer;
  c. selectively decomposing the more unstable free radical generating center(s) of the sequential initiator in the presence of the vinyl monomer, whereby said vinyl monomer is at least partially polymerized thereby forming a photoconductive vinyl polymer terminated with that portion of the sequential initiator containing the more stable free radical generating center(s);
  d. combining said photoconductive vinyl polymer and a second addition monomer by dissolving both in a liquid reaction medium, said liquid reaction medium being a solvent for the photoconductive vinyl polymer and the second addition monomer and a non-solvent for the block copolymer segments and homopolymers derived from the second addition monomer; and
  e. adding sufficient vinyl monomer to the liquid reaction medium to effect termination of the propagating radical of the insoluble polymers contained therein, said vinyl monomer being soluble in the liquid reaction medium.

13. The process of claim 12 wherein the polymer segments derived from said second addition monomer are photoconductive.

14. The process of claim 12 wherein the polymer segments derived from said second addition monomer are non-photoconductive.

15. The process of claim 12 wherein said second addition monomer is an acrylate.

16. The process of claim 12 wherein said vinyl monomer is a vinylcarbazole.

17. The process of claim 12 wherein said vinyl monomer is N-vinylcarbazole.

18. The process of claim 12 wherein said vinyl monomer is incapable of anion initiated addition polymerization.

19. The process of claim 12 wherein said second addition monomer is incapable of anion initiated addition polymerization.

20. The process of claim 12 wherein said photoconductive vinyl monomer and said second addition monomer are both incapable of anion initiated polymerization.

21. A process for preparation of block copolymers having photoconductive segments derived from a vinyl monomer and segments derived from a second addition monomer, at least one of said photoconductive vinyl monomer and said second monomer being incapable of polymerization by anion initiated polymerization techniques and both said monomers being capable of polymerization by free radical initiated addition polymerization techniques, said process comprising:
  a. providing a sequential free radical initiator compound having at least two free radical generating centers of differing stability one of said free radical generating centers being more unstable than the other(s) in that it is more prone to decomposition upon exposure to thermal, electromagnetic or chemical stimuli;
  b. intimately contacting said sequential free radical initiator with the addition monomer;
  c. selectively decomposing the more unstable free radical generating center(s) of the sequential initiator in the presence of the addition monomer, whereby said addition monomer is at least partially polymerized thereby forming an addition polymer which is terminated with that portion of the sequential initiator containing the more stable free radical generating center(s);

d. combining said addition polymer and the vinyl monomer by dissolving both in a liquid reaction medium, said liquid reaction medium being a solvent for the addition polymer and the vinyl monomer and a non-solvent for the block copolymer segments and homopolymers derived from the vinyl monomer;

e. decomposing the terminal groups of said addition polymer to free radicals in the presence of said vinyl monomer, whereby at least some of said vinyl monomer is polymerized and forms a photoconductive polymer segment attached to the addition polymer, thereby causing the addition polymer to become increasingly less soluble in the liquid reaction medium; and f. adding sufficient addition monomers to the liquid reaction medium to effect termination of the propagating radical of the insoluble polymers contained therein, said addition vinyl monomer being soluble in the liquid reaction medium.

22. The process of claim 21 wherein the polymer segments derived from said second addition monomer are photoconductive.

23. The process of claim 21 wherein the polymer segments derived from said second addition monomer are non-photoconductive.

24. The process of claim 21 wherein said second addition monomer is an acrylate.

25. The process of claim 21 wherein said vinyl monomer is a vinylcarbazole.

26. The process of claim 21 wherein said vinyl monomer is N-vinylcarbazole.

27. The process of claim 21 wherein said vinyl monomer is incapable of anion initiated addition polymerization.

28. The process of claim 21 wherein said addition monomer is incapable of anion initiated polymerization.

29. The process of claim 21 wherein said vinyl monomer and said second addition monomer are both incapable of anion initiated addition polymerization.

30. A process for preparation of block copolymers having photoconductive segments derived from a vinyl monomer and segments derived from a second addition monomer, said process comprising:

a. providing a photoconductive vinyl polymer having terminal groups capable of decomposition to free radicals;

b. combining said photoconductive vinyl polymer and a second addition monomer by dissolving both in a liquid reaction medium, said liquid reaction medium being a solvent for the photoconductive vinyl polymer and the second addition monomer and a non-solvent for the block copolymer segments and homopolymers derived from the second addition monomer; and c. decomposing the terminal groups of said photoconductive polymer to free radicals in the presence of said second addition monomer, whereby at least some of said second addition monomer is polymerized and forms a polymer segment attached to the photoconductive polymer thereby causing this block polymer to become increasingly less soluble in the liquid reaction medium; and d. adding sufficient vinyl monomer corresponding to the structural units of the photoconductive polymer to the liquid reaction medium to effect termination of the propagating radical of the insoluble polymers contained therein, said vinyl monomer being soluble in the liquid reaction medium.

31. A process for preparation of block copolymers having photoconductive segments derived from a vinyl monomer and segments derived from a second addition monomer, said process comprising:

a. providing a non-photoconductive addition polymer having terminal groups capable of decomposition to free radicals;

b. combining said non-photoconductive addition polymer and said vinyl monomer by dissolving both in a liquid reaction medium, said liquid reaction medium being a solvent for the non-photoconductive addition polymer and the vinyl monomer and a non-solvent for the block copolymer segments and homopolymers derived from the vinyl monomer;

c. decomposing the terminal groups of said non-photoconductive polymer to free radicals in the presence of said vinyl monomer, whereby at least some of said vinyl monomer is polymerized and forms photoconductive polymer segments attached to the non-photoconductive polymer, thereby causing the non-photoconductive polymer to become increasingly less soluble in the liquid reaction medium; and d. adding sufficient non-photoconductive addition monomer to the liquid reaction medium to effect termination of the propagating radical of the insoluble polymers contained therein, said non-photoconductive addition monomer being soluble in the liquid reaction medium.

32. A process for preparation of block copolymers having photoconductive segments derived from a vinyl monomer and segments derived from a second addition monomer, said process comprising:

a. providing a sequential free radical initiator compound having at least two free radical generating centers of differing stability, one of said free radical generating centers being more unstable than the other(s) in that it is more prone to decomposition upon exposure to thermal, electromagnetic or chemical stimuli;

b. intimately contacting said sequential free radical initiator with the vinyl monomer;

c. selectively decomposing the more unstable free radical generating center(s) of the sequential initiator in the presence of the vinyl monomer, whereby said vinyl monomer is at least partially polymerized thereby forming a photoconductive vinyl polymer terminated with that portion of the sequential initiator containing the more stable free radical generating center(s);

d. combining said photoconductive vinyl polymer and a second addition monomer by dissolving both in a liquid reaction medium, said liquid reaction medium being a solvent for the photoconductive vinyl polymer and the second addition monomer and a non-solvent for the block copolymer segments and homopolymers derived from the second addition monomer; and e. adding sufficient vinyl monomer to the liquid reaction medium to effect termination of the propagating radical of the insoluble polymers contained therein, said vinyl monomer being soluble in the liquid reaction medium.

33. A process for preparation of block copolymers having photoconductive segments derived from a vinyl monomer and segments derived from a second addition monomer, said process comprising:
   a. providing a sequential free radical initiator compound having at least two free radical generating centers of differing stability one of said free radical generating centers being more unstable than the other(s) in that it is more prone to decomposition upon exposure to thermal, electromagnetic or chemical stimuli;
   b. intimately contacting said sequential free radical initiator with the addition monomer;
   c. selectively decomposing the more unstable free radical generating center(s) of the sequential initiator in the presence of the addition monomer, whereby said addition monomer is at least partially polymerized thereby forming an addition polymer which is terminated with that portion of the sequential initiator containing the more stable free radical generating center(s);
   d. combining said addition polymer and the vinyl monomer by dissolving both in a liquid reaction medium, said liquid reaction medium being a solvent for the addition polymer and the vinyl monomer and a non-solvent for the block copolymer segments and hompolymers derived from the vinyl monomer;
   e. decomposing the terminal groups of said addition polymer to free radicals in the presence of said vinyl monomer, whereby at least some of said vinyl monomer is polymerized and forms a photoconductive polymer segment attached to the addition polymer, thereby causing the addition polymer to become increasingly less soluble in the liquid reaction medium; and
   f. adding sufficient addition monomer to the liquid reaction medium to effect termination of the propagating radical of the insoluble polymers contained therein, said addition vinyl monomer being soluble in the liquid reaction medium.

* * * * *